(12) United States Patent
Liu et al.

(10) Patent No.: US 8,917,707 B2
(45) Date of Patent: Dec. 23, 2014

(54) TECHNIQUES FOR CHANNEL STATE INFORMATION FEEDBACK IN WIRELESS COMMUNICATION SYSTEM

(75) Inventors: Lingjia Liu, Plano, TX (US); Jianzhong Zhang, Irving, TX (US); Inho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 910 days.

(21) Appl. No.: 12/758,322

(22) Filed: Apr. 12, 2010

(65) Prior Publication Data

US 2010/0271968 A1  Oct. 28, 2010

Related U.S. Application Data

(60) Provisional application No. 61/214,524, filed on Apr. 24, 2009.

(51) Int. Cl.
| | |
|---|---|
| H04B 7/02 | (2006.01) |
| H04W 24/10 | (2009.01) |
| H04L 25/02 | (2006.01) |
| H04L 5/00 | (2006.01) |

(52) U.S. Cl.
CPC .............. *H04W 24/10* (2013.01); *H04L 5/003* (2013.01); *H04L 25/0202* (2013.01)
USPC ........................................................ 370/338

(58) Field of Classification Search
USPC ................. 370/252, 253, 328–338, 340–341; 455/454
See application file for complete search history.

(56) References Cited

U.S. PATENT DOCUMENTS

2010/0239036 A1* 9/2010 Koo et al. ..................... 375/260

FOREIGN PATENT DOCUMENTS

KR  10-2008-0101014 A  11/2008

OTHER PUBLICATIONS

Huawei, "Standardization of MU-MIMO", 3GPP TSG RAN WG1 meeting #48ibs, R1-071412, St Julian, Malta, Mar. 26-30, 2007, See pp. 1-3.
Samsung Co., Ltd "Design Considerations for CoMP Joint Transmission", 3GPP TSG RAN WG1 Meeting # 56bis, R1-091232, Seoul, Korea, Mar. 23-27, 2009, See the pp. 1-9.
Panasonic Inc, "CoMP CQI Reporting", 3GPP TSG RAN WG1 Meeting # 56bis, R1-09166, Seoul, Korea, Mar. 23-27, 2009, See the pp. 1-2.

* cited by examiner

*Primary Examiner* — Pao Sinkantarakorn
(74) *Attorney, Agent, or Firm* — Jefferson IP Law, LLP (57) ABSTRACT

Methods for a User Equipment (UE) to transmit Channel Quality Index (CQI) feedback information, and an indicator in feedback information, to an evolved Node B (eNB) in a wireless communication system, and apparatuses therefore, are provided. A method for a UE to transmit CQI feedback information to eNB in a wireless communication system, includes obtaining one or more Transmission Points Configurations for Coordinated MultiPoint (CoMP) (TPCCs), each TPCC including a unique combination of one or more cells in a CoMP measurement set, estimating a channel for one or more cells in the CoMP measurement set, computing a CQI for each of at least one of the one or more TPCCs, each CQI being computed using one or more estimated channels that correspond to the combination of one or more cells included in a corresponding TPCC, generating CQI feedback information based on the one or more CQIs, and transmitting the CQI feedback information.

12 Claims, 7 Drawing Sheets

TECHNIQUES FOR CHANNEL STATE INFORMATION FEEDBACK IN WIRELESS COMMUNICATION SYSTEM

CROSS-REFERENCE TO RELATED APPLICATIONS

This application claims the benefit under 35 U.S.C. §119 (e) of a U.S. Provisional application filed on Apr. 24, 2009 in the U.S. Patent and Trademark Office and assigned Ser. No. 61/214,524, the entire disclosure of which is hereby incorporated by reference.

BACKGROUND OF THE INVENTION

1. Field of the Invention

Aspects of the present invention relate to techniques for use in a wireless communication system. More particularly, aspects of the present invention relate to techniques for channel state information feedback in a wireless communication system.

2. Description of the Related Art

First release 3rd Generation Partnership Project (3GPP) Long Term Evolution (LTE) does not meet the International Mobile Telecommunications (IMT)-Advanced requirements for 4th Generation (4G) cellular wireless communication systems. Accordingly, a 4G version of LTE is being developed that is referred to as LTE-Advanced (LTE-A). A challenging aspect in the development of LTE-A is improving upon first release 3GPP LTE in the area of average cell throughput and cell-edge user throughput. It has been suggested that Down-Link (DL) higher order Multiple Input Multiple Output (MIMO) systems and DL Coordinated MultiPoint (CoMP) transmission may be used in LTE-A to meet the IMT-Advanced DL spectral efficiency requirements. To facilitate these enabling technologies, it has been agreed to only use dedicated antenna ports to support DL transmission demodulation in LTE-A systems.

Since DL transmission is based on Dedicated Reference Signals (DRSs), a channel feedback report would be beneficial in LTE-A systems. In first release 3GPP LTE systems, channel feedback is based on the properties of a transmission scheme. For example, Precoding Matrix Indication (PMI), Channel Quality Indication (CQI), and Rank Indicator (RI) reports together specify a particular transmit scheme at the network side. Even though the feedback is related to the DL wireless channel, information on the transmission scheme is also included. Accordingly, in the DL transmission, the network informs User Equipment (UE) of which transmission scheme it is using through Transmit Pre-coding Matrix Indication (TPMI). However, in LTE-A systems, it will not be necessary for the network to inform the UE about the transmission scheme being used, and thus the UpLink (UL) feedback may be focused on accurately feeding back information on the wireless channel from the UE to the network.

A method referred to as multiple description code has been proposed to achieve better feedback performance for LTE-A systems. The scheme takes advantage of the different realizations of similar channels using independent codebooks. Here, the UE will feedback the precoding matrix indices or channel direction indices of different codebooks at different channel feedback reports. Therefore, if the channel is not changing too much between consecutive channel feedback reports, the multiple feedbacks can be combined to generate a more accurate estimate of the channel. While this scheme will not introduce additional UL overhead, it does require the network to know all the different codebooks.

While this technique may improve the channel feedback quality, it does have drawbacks. For example, this technique may only work in a situation where the channels between different UL feedbacks are highly correlated. If the channels are independent, this scheme actually will impair system performance, since the network will be making decisions on the precoding of the DL transmission based on irrelevant channel feedback reports.

Another technique that is being considered for LTE-A systems relates to Coordinated MultiPoint (CoMP) and, in particular, to the CQI feedback of CoMP. In LTE-A systems, an average cell throughput and a cell-edge user throughput are targeted that are much higher than that of first release 3GPP LTE. CoMP is considered to be one of the more promising techniques to achieve this goal. CoMP transmission has been classified into two categories, namely coordinated scheduling and/or beam-forming, and CoMP joint transmission.

In the class of coordinated scheduling and/or beam-forming, data for a UE is simultaneously transmitted from one cell (also referred to as evolved Node Bs (eNBs) or Base Stations (BSs)) while scheduling decisions are coordinated to control the interference generated in a set of coordinated cells. In other words, the data intended for a particular UE is not shared while some information related to the channels and the controls are shared among different cells. In this class of operations, the signals received from other cells are treated as inter-cell interference and are avoided in the spatial, frequency or time domain.

On the other hand, in the class of joint processing/transmission, data for a UE is simultaneously transmitted from multiple transmission points to improve the received signal quality and/or actively cancel interference for other UEs. In this case, data intended for a particular UE is shared among different cells and is jointly processed at these cells. As a result of this joint processing, the received signals at the intended UE will be coherently or non-coherently added together. In this class of operations, the signals received from other cells are treated as useful signals which may contribute to a higher received Signal-to-Noise Ratio (SNR) at the UE. Within this mode of operation, two classes of transmission schemes are identified, namely CoMP Single User (SU)-MIMO and CoMP Multi-User (MU)-MIMO.

To enable the joint transmission of the data for a UE, the serving cells should have knowledge of the channels between the severing cells and the intended UE, which is similar to that of transmission in first release 3GPP LTE. However, additional information regarding the joint channel is needed for enabling CoMP joint transmission. An example of CoMP joint transmission from two cells (or eNBs) is described below with reference to FIG. 1.

Figure 1:
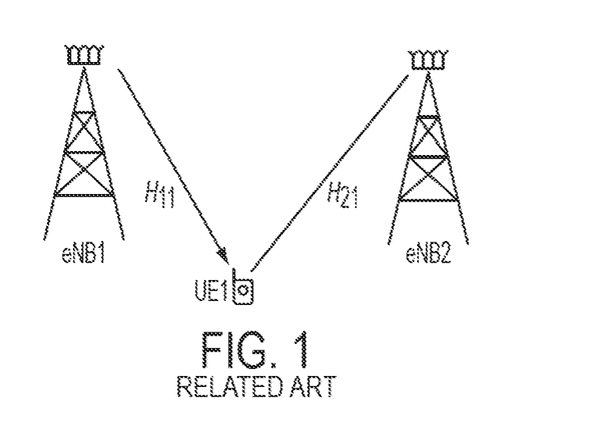
FIG. 1 illustrates Coordinated MultiPoint (CoMP) joint transmission from two cells according to the related art.

FIG. 1 illustrates CoMP joint transmission from two cells according to the related art.

Referring to FIG. 1, two cells (eNB1 and eNB2) are performing CoMP joint transmission to UE1. UE1 receives respective signals from both eNB1 and eNB2. Instead of treating one of the received signals as interference, both the signals are intended for UE1 and are superposed with each other over the air. The received signal at UE1 may be represented by:

$$Y_1 = H_{11} w_1 X_1 + H_{21} w_2 X_1 + N_1 \qquad (1)$$

where $N_{Ti}$ denotes the number of transmit antennas at eNB i, $N_R$ denotes the number of receive antennas at UE1, $H_{11}$ denotes the channel gain from eNB1 to UE1, $H_{21}$ denotes the channel gain from eNB2 to UE1, $Y_1$ denotes the $N_R \times 1$ vector of received signal at UE1, $X_1$ denotes the intended message for UE1, $w_i$ denotes the $N_{Ti} \times v$ precoding vector of transmitted signal at eNB i, $N_1$ denotes the $N_R \times 1$ Additive White Gaussian Noise (AWGN) vector, and V denotes the number of transmission layers of signal $X_1$.

In order to enable the CoMP joint processing operation, the network determines which set of cells will be transmitting to a particular CoMP UE and the corresponding channel information. An example of this process will be described below with reference to FIG. 2.

Figure 2:
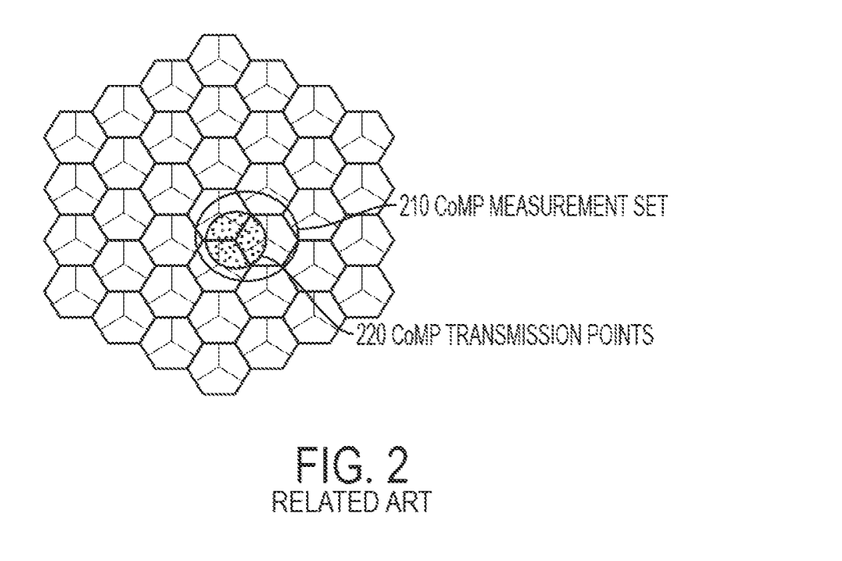
FIG. 2 illustrates sets of cells used in a CoMP joint processing operation according to the related art.

FIG. 2 illustrates sets of cells used in a CoMP joint processing operation according to the related art.

Referring to FIG. 2, for a given CoMP UE, the network configures a set of cells (referred to as a COMP measurement set 210). The COMP measurement set 210 is substantially the same as a measurement set in first release 3GPP LTE systems. The CoMP UE measures the channels between it and the cells of the COMP measurement set 210. Based on the measurement, the CoMP UE reports channel information (i.e., channel coefficients, precoding matrix indices, channel quality indices, etc.) to the network. The CoMP measurement set 210 may be configured by the network with the assistance of the CoMP UEs. After obtaining the channel information, the network determines a set of cells (referred to as active CoMP transmission points 220) that send a CoMP Physical DL Shared Channel (PDSCH) to the CoMP UE and perform the CoMP joint processing.

The configuration of the CoMP measurement set should be semi-statistic and UE-specific. This is crucial for the UL overhead since the UL channel quality reporting of CoMP UE is directly tied to the CoMP measurement set. Due to how demodulation of CoMP PDSCH has been determined to be performed, the network will have complete freedom in deciding the active CoMP set. In this sense, the CQI feedback of the CoMP becomes difficult because, when computing CQI, certain transmission modes have to be assumed.

Based on an analysis of CQI reporting mechanisms for CoMP, it has been suggested that to improve spectral efficiency of the DL CoMP joint processing, accurate link adaptation is needed. However, since the CoMP transmission points are completely transparent to the UEs. UEs have to figure out what the possible CoMP transmission modes are and compute the CQIs accordingly. CQI feedback mechanisms are mainly classified into two classes, namely individual feedback and joint feedback.

In individual feedback, the CQI values are computed assuming that each individual cell within the CoMP measurement set is transmitting while treating the signals from all the other cells as interference (even the other cells within the measurement set). This class is similar to first release 3GPP LTE CQI feedback.

In joint feedback, the CQI values are computed assuming that all the cells within in the CoMP measurement set are jointly transmitting to the UE. This serves as the best CQI value.

A scheme has been proposed to use mixed CQI feedback and have the UE feeds back some CQI values within the individual feedback together with the joint feedback. However, the main drawback of this approach is that it is extremely difficult to combine the individual feedback with joint feedback to obtain the CQI values for other transmission modes since CQI values are Modulation Coding Schemes (MCS) related to the Signal to Interference-plus-Noise Ratio (SINR) values of the received signals.

Therefore, a need exists for new techniques for channel state information feedback in a wireless communication system.

SUMMARY OF THE INVENTION

An aspect of the present invention is to address at least the above-mentioned problems and/or disadvantages and to provide at least the advantages described below. Accordingly, an aspect of the present invention is to provide techniques for channel state information feedback in a wireless communication system.

In accordance with an aspect of the present invention, a method for a User Equipment (UE) to transmit Channel Quality Index (CQI) feedback information to an evolved Node B (eNB) in a wireless communication system is provided. The method includes obtaining one or more Transmission Points Configurations for Coordinated MultiPoint (CoMP) (TPCCs), each TPCC including a unique combination of one or more cells in a CoMP measurement set, estimating a channel for one or more cells in the CoMP measurement set, computing a CQI for each of at least one of the one or more TPCCs, each CQI being computed using one or more estimated channels that correspond to the combination of one or more cells included in a corresponding TPCC, generating CQI feedback information based on the one or more CQIs, and transmitting the CQI feedback information.

In accordance with another aspect of the present invention, a method for a UE to transmit an indicator in feedback information to an eNB in a wireless communication system is provided. The method includes determining, based on one or more performance metrics of a previous channel estimate and a current channel estimate, if the eNB can perform downlink transmission precoding based on one of current feedback information together with previous feedback information and only the current CQI feedback information, generating feedback information, the feedback information including an indicator indicating that the eNB can perform downlink transmission precoding based on one of current feedback information together with previous feedback information and only the current CQI feedback information, and transmitting the feedback information.

In accordance with yet another aspect of the present invention, a UE apparatus for transmitting CQI feedback information to an eNB in a wireless communication system is provided. The apparatus includes apparatus includes a receiver for receiving signals from one or more cells in a CoMP measurement set, a transmitter for transmitting signals to at least one cell, and a controller. The controller controls the receiver and transmitter, and controls to obtain one or more TPCCs, each TPCC including a unique combination of one or more cells in a CoMP measurement set, controls to estimate a channel for one or more cells in the CoMP measurement set, controls to compute a CQI for each of at least one of the one or more TPCCs, each CQI being computed using one or more estimated channels that correspond to the combination of one or more cells included in a corresponding TPCC, controls to generate CQI feedback information based on the one or more CQIs, and controls the transmitter to transmit the CQI feedback information.

In accordance with yet another aspect of the present invention, a UE apparatus for transmitting an indicator in feedback information to an eNB in a wireless communication system is provided. The apparatus includes a receiver for receiving signals from at least one eNB, a transmitter for transmitting signals to at least one eNB, and a controller. The controller controls the receiver and transmitter, controls to determine, based on one or more performance metrics of a previous channel estimate and a current channel estimate, if the eNB can perform downlink transmission precoding based on one of current feedback information together with previous feedback information and only the current CQI feedback information, controls to generate feedback information, the feedback information including an indicator indicating that the eNB can perform downlink transmission precoding based on one of current feedback information together with previous feedback information and only the current CQI feedback information, and controls the transmitter to transmit the feedback information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, a measurement error, measurement accuracy limitations and other factors known to those of skill in the art, may occur in amounts that do not preclude the effect the characteristic was intended to provide.

It should be understood that the following description might refer to terms utilized in various standards merely for simplicity of explanation. For example, the following description may refer to terms utilized in a 3rd Generation Partnership Project (3GPP) Long Term Evolution (LTE) standard or a 3GPP LTE-Advanced (LTE-A) standard. However, this description should not be interpreted limiting the present invention to application with any particular standard. Independent of the mechanism used to implement any of the techniques described herein, it is advantageous for these techniques to conform to a standardized mechanism.

In exemplary embodiments of the present invention the term 'cell', Base Station (BS), and evolved Node B (eNB) may be used interchangeably. In addition, in exemplary embodiments of the present invention the term 'Mobile Station' and User Equipment (UE) may be used interchangeably. Channel Quality Index (CQI) feedback for DownLink (DL) Coordinated MultiPoint (CoMP)

In DL CoMP joint processing, a CoMP measurement set will consist of multiple cells. One of the cells included in the CoMP measurement set is an anchor cell. Since the DL demodulation of CoMP is based on dedicated reference signals, the CoMP transmission points may be transparent to CoMP UEs. Furthermore, the CoMP transmission points may be constructed from different subsets of the CoMP measurement set. An example of a CoMP measurement set is described below with reference to FIG. 3.

Figure 3:
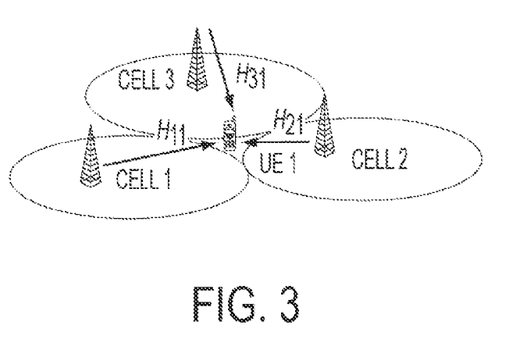
FIG. 3 illustrates three cells included in a CoMP measurement set according to an exemplary embodiment of the present invention.

FIG. 3 illustrates three cells included in a CoMP measurement set according to an exemplary embodiment of the present invention.

Referring to FIG. 3, the CoMP measurement set for UE 1 includes three cells, namely Cell 1, Cell 2, and Cell 3. Herein, Cell 1 is an anchor cell, Cell 2 and Cell 3 are candidate cells, and UE 1 is a CoMP UE. Cell 1, Cell 2, and Cell 3 transmit reference signals to UE 1. The reference signals are used by UE 1 to determine respective channel estimates H11, H21, and H31 between Cell 1, Cell 2, and Cell 3, and UE 1. For simplicity of explanation, certain exemplary embodiments of the present invention may be described in the context of the CoMP measurement set of FIG. 3. However, the present invention is not limited to the CoMP measurement set of FIG. 3.

CQI feedback is a component of link adaptation that is used to increase spectral efficiency. However, in order to compute a CQI for feedback, the UE should have knowledge of Transmission Points Configurations for CoMP (TPCCs). Since the CoMP transmission points may be completely transparent to the UE and may be constructed from different subsets of the CoMP measurement set, CQI feedback mechanisms for CoMP that address this issue should be employed. Herein, a CQI of given TPCC may be based on channel estimates for cells of the given TPCC. Exemplary embodiments of the present invention include a number of CQI feedback mechanisms that address the above identified issue.

First Exemplary Embodiment

An exemplary embodiment of the present invention includes a technique for UEs to feedback multiple CQIs according to different TPCCs in an UpLink (UL) CQI feedback report. The UL CQI feedback may be included in one of a Physical UL Control CHannel (PUCCH), a Physical UL Shared Channel (PUSCH), and the like. The CQI feedback may be configured based on any of a number of exemplary schemes. In a first exemplary scheme, the CQI feedback may be based on TPCCs that are semi-statistically configured by the network through higher layer signaling. In other words, the network informs the UE of the TPCCs. In a second exemplary scheme, the CQI feedback may be based on TPCCs configured by the UE based on the best M TPCCs. Here, M is a number that the network may inform to the UE. Regardless of whether the first or second exemplary schemes are implemented, the CQI feedback may always additionally include a CQI value based on single cell transmission from an anchor cell. Herein, for a particular TPCC, CQI values may be based on a wideband CQI or a UE selected subband CQI.

The TPCC configuration may be based on the number of transmission points in the actual CoMP Physical DL Shared Channel (PDSCH) transmission. In addition, the TPCC configuration may be a predefined class of transmission point subsets. For example, assuming the CoMP measurement set of FIG. 3, which includes Cell 1, Cell 2, and Cell 3, all possible TPCCs include:

TPCC 1: Cell 1
TPCC 2: Cell 1 and Cell 2
TPCC 3: Cell 1, Cell 2 and Cell 3
TPCC 4: Cell 2
TPCC 5: Cell 3
TPCC 6: Cell 2 and Cell 3
TPCC 7: Cell 1 and Cell 3

The above TPCCs are not configured in any particular order. However, a particular order may be determined by the network or UE. Also, while the above TPCCs list all possible TPCCs, a lesser number of TPCCs may be configured by the network or UE. However, the above TPCC configuration assumes that any cell may participate in the CoMP PDSCH transmission. However, if it is assumed that the anchor cell (Cell 1) should be one of cells that participate in the CoMP PDSCH transmission, the TPCC configuration may be limited to TPCCs that include Cell 1. In this case, the possible TPCCs may include:

TPCC 1: Cell 1
TPCC 2: Cell 1 and Cell 2
TPCC 3: Cell 1, Cell 2 and Cell 3
TPCC 4: Cell 1 and Cell 3

The above TPCCs are not configured in any particular order. However, a particular order may be determined by the network or UE. Also, while the above TPCCs list all possible TPCCs, a lesser number of TPCCs may be configured by the network or UE. CQI feedback will be discussed in further detail below.

Second Exemplary Embodiment

An exemplary embodiment of the present invention includes a technique for computing CQI feedback for DL CoMP joint processing based on TPCCs, where, for each TPCC, there are a different number of CoMP transmission points in the actual transmission of CoMP PDSCH. The exact number of TPCCs a CoMP UE needs to provide feedback for, and the corresponding arrangement of the TPCCs, may be determined or semi-statistically configured by the network.

In addition, there are a number of schemes by which the CQI feedback may be computed, two examples of which are provided below.

In a first exemplary scheme, the TPCCs of DL CoMP joint processing, for which CQI values are based, include:

TPCC for single cell transmission of CoMP PDSCH: anchor cell is transmitting to target UE while treating other cells' signals as interference.

TPCC for two cells transmission of CoMP PDSCH: anchor cell and best candidate cell are transmitting to target UE while treating other cells' signals as interference. The best candidate cell is the cell other than the anchor cell that has the strongest received signal power at the target UE.

TPCC for three cells transmission of CoMP PDSCH: anchor cell and best two candidate cells are transmitting to target UE while treating other cells' signals as interference.

TPCC for all cell transmission of CoMP PDSCH: all cells within CoMP cooperating set are transmitting to target UE while treating other cells' signals as interference.

In a second exemplary scheme, the TPCCs of DL CoMP joint processing on which CQI values are based include:

TPCC for single cell transmission of CoMP PDSCH: anchor cell is transmitting to target UE while treating other cells' signals as interference.

TPCC for two cells transmission of CoMP PDSCH: anchor cell and any other cell within CoMP measurement set are transmitting to target UE while treating other cells' signals as interference.

TPCC for three cells transmission of CoMP PDSCH: anchor cell and any other two cells within CoMP measurement set are transmitting to target UE while treating other cells' signals as interference.

TPCC for all cells transmission of CoMP PDSCH: all cells within CoMP cooperating set are transmitting to target UE while treating other cells' signals as interference.

The examples of the first and second exemplary schemes described above assume there are at least four cells in the CoMP measurement set. However, when there are less than four cells in the CoMP measurement set, the TPCCs will include less TPCCs than those described above. For example, for the CoMP measurement set of FIG. 3, which includes three cells, the TPCCs will include a TPCC for single cell transmission, a TPCC for two cells transmission, and a TPCC for three cells transmission. Similarly, when the CoMP measurement set includes two cells, the TPCCs will include a TPCC for single cell transmission and a TPCC for two cells transmission.

An example of computing CQI feedback for DL CoMP joint processing based on TPCCs is described below with reference FIG. 4 in the context of the CoMP measurement set of FIG. 3.

Figure 4:
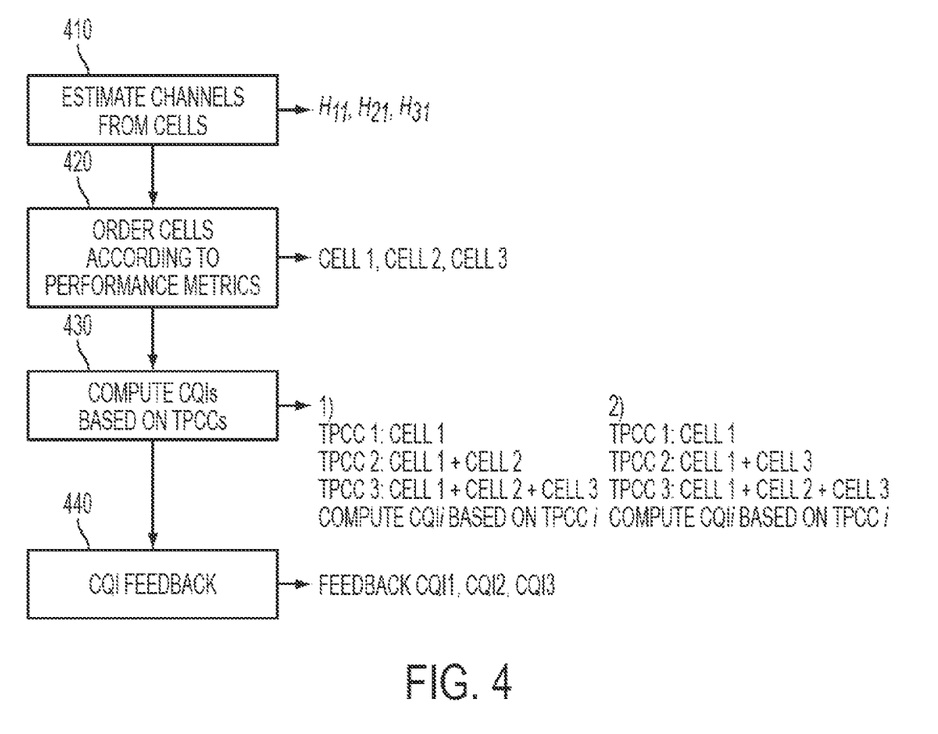
FIG. 4 illustrates a flowchart for CoMP Channel Quality Index (CQI) feedback based on Transmission Points Configurations for CoMP (TPCCs) according to an exemplary embodiment of the present invention.

FIG. 4 illustrates a flowchart for CoMP CQI feedback based on TPCCs according to an exemplary embodiment of the present invention.

Referring to FIG. 4, in step 410, a UE (e.g., UE 1 of FIG. 3) receives reference signals from cells included in a CoMP measurement set (e.g., Cell 1, Cell 2, and Cell 3 of FIG. 3), and determines channel estimates (e.g., H11, H21, and H31 of FIG. 3) of the channels between the cells included in the CoMP measurement set and the UE.

In step 420, the UE may determine an order of the cells within the CoMP measurement set based on one or more performance metrics. The performance metrics may include any performance metric related to the UE's received signal quality. For example, the performance metrics may be one or more of throughput, capacity, Signal to Interference plus Noise Ratio (SINR), Signal to Noise Ratio (SNR), received signal strength, etc. For the CoMP measurement set shown in the FIG. 3, it is assumed that the UE determines the order of the cells to be Cell 1, Cell 2, and Cell 3.

In step 430, the UE may compute CQIs based on TPCCs it configures. More specifically, in step 430, the UE may compute CQIs for TPCCs configured based on one of the above two exemplary schemes. For example, for the CoMP measurement set shown in the FIG. 3, and based on the first exemplary scheme, the UE 1 may compute the TPCCs as:

TPCC 1: Cell 1
TPCC 2: Cell 1+Cell 2
TPCC 3: Cell 1+Cell 2+Cell 3

For the CoMP measurement set shown in the FIG. 3, and based on the second exemplary scheme, the UE 1 may compute the TPCCs as:

TPCC 1: Cell 1
TPCC 2: Cell 1+Cell 3
TPCC 3: Cell 1+Cell 2+Cell 3

The UE computes a CQI value based on each TPCC. After the CQIs are computed for each TPCC in step 430, the UE jointly feds back the computed CQIs to the network in step 440. In the above example, CQI1, CQI2, and CQI3, corresponding to TPCC1, TPCC2, and TPCC3, would be fed back to the network in step 440.

Third Exemplary Embodiment

An exemplary embodiment of the present invention includes a technique for encoding CQI values for respective TPCCs differentially. Here, the CQI value for a predefined TPCC is selected as the reference CQI while the other CQI values are encoded differentially. In an exemplary implementation, the differential CQI values may be encoded differentially using a certain number of bits relative to the reference CQI (e.g., 2-bits, 3-bits, etc.). For example, if the reference CQI is 4-bits, the differential CQIs may be 2-bits or 3-bits. This may be accomplished by subtracted from the original CQI values of the differential CQIs. Alternatively, the original CQI values of the differential CQIs may be subtracted from the CQI value of the reference CQI.

Accordingly, the CQI feedback may include original CQI value of the reference CQI, together with the differential CQI values. There are a number of exemplary schemes that may be used to determine which CQI value will be the reference CQI. In a first exemplary scheme, the CQI value for a TPCC of a single cell transmission may be selected as a reference CQI. In a second exemplary scheme, the CQI value for a TPCC of an all cell transmissions may be selected as a reference CQI.

Fourth Exemplary Embodiment

An exemplary embodiment of the present invention includes a technique for a UE to feedback CQI values for the M best TPCCs, as observed by the UE, as well as the CQI value for single cell transmission mode. Here, M denotes the number of best TPCCs. The value M may be preconfigured by the network semi-statistically through higher layer signaling. The M best TPCCs may exclude the TPCC for single cell transmission mode. Possible TPCCs may be preconfigured by the network with the UE determining the best M best TPCCs from among the possible TPCCs. Alternatively, the possible TPCCs may be configured by the UE with the UE determining the best M TPCCs from among the possible TPCCs. The configuration of the possible TPCCs may be based on the number of cells participating in the CoMP PDSCH transmission.

The UE computes the CQIs for each of the M best TPCCs (best through Mth best TPCCs), as well as the CQI for the single cell transmission mode. In terms of CQI feedback, any of a number of CQI feedback schemes may be employed by the UE, examples of which are described below.

In a first exemplary scheme, the CQI feedback for the UE may include the original CQI values for the M best TPCCs (best through Mth best TPCCs) and the original CQI value for single cell transmission.

In a second exemplary scheme, the CQI feedback for the UE may include the original CQI value for the best TPCC (the reference CQI) and the other CQI values differentially encoded relative to the reference CQI value. Here, the other CQI values may be differentially encoded into 2-bits, 3-bits, etc. relative to the reference CQI value.

In a third exemplary scheme, the CQI feedback for the UE may include the original CQI value for the Mth best TPCC (the reference CQI) and the other CQI values differentially encoded relative to the reference CQI value. Here, the other CQI values may be differentially encoded into 2-bits, 3-bits, etc. relative to the reference CQI value.

In a fourth exemplary scheme, the CQI feedback for the UE may include the original CQI value for the single cell transmission (the reference CQI) and the other CQI values differentially encoded relative to the reference CQI value. Here, the other CQI values may be differentially encoded into 2-bits, 3-bits, etc. relative to the reference CQI value.

An example of computing CQI feedback for DL CoMP joint processing based on the M best TPCCs is described below with reference FIG. 5.

Figure 5:
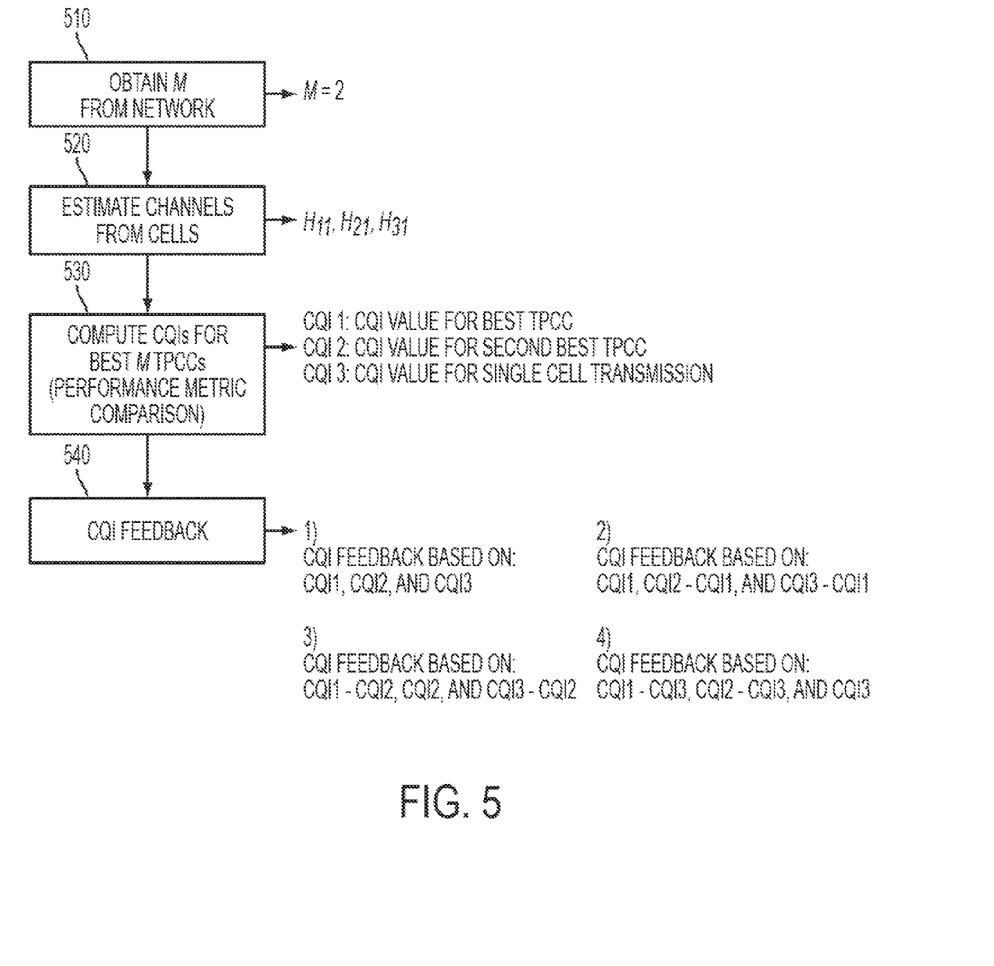
FIG. 5 illustrates a flowchart for CoMP CQI feedback based on the best M TPCCs according to an exemplary embodiment of the present invention.

FIG. 5 illustrates a flowchart for CoMP CQI feedback based on the best M TPCCs according to an exemplary embodiment of the present invention.

Referring to FIG. 5, in step 510, a UE (e.g., UE 1 of FIG. 3) obtains a value of M from the network. For example, the value of M may be '2'. In step 520, the UE receives reference signals from cells included in the CoMP measurement set (e.g., Cell 1, Cell 2, and Cell 3 of FIG. 3), and determines channel estimates (e.g., H11, H21, and H31 of FIG. 3) of the channels between the cells included in the CoMP measurement set and the UE.

In step 530, the UE may compute CQIs for the best M TPCCs (best through Mth best TPCCs) based on one or more performance metrics, as well as the CQI for the for the single cell transmission mode. The performance metrics may include any performance metric related to the UE's received signal quality. For example, the performance metrics may be one or more of throughput, capacity, SINR, SNR, received signal strength, etc. Also, the fact that different TPCCs will require a different number of transmitting cells may also be taken into account. For example, the absolute performance metric such as throughput, capacity, SINR, SNR, received signal strength, etc. may be divided by the number of cells participating in the transmission so as to form the performance metric for different TPCCs. An example of computing CQIs for the best M operation modes, as well as the CQI for the for the single cell transmission mode, where M=2, includes:

CQI 1: CQI value for best TPCC
CQI 2: CQI value for second best TPCC
CQI 3: CQI value for single cell operation mode In step 540, the UE may provide CQI feedback based on any of the four exemplary schemes described above. For example, when the UE provides CQI feedback based on the first exemplary scheme, the CQI report may be based on the original CQI values for the M best TPCCs (best through Mth best TPCCs) and the original CQI value for single cell transmission. Accordingly, for the above example of computed CQI reports with M=2, and based on the first exemplary scheme, the CQI feedback may be based on CQI 1, CQI 2, and CQI 3.

In another example, when the UE provides CQI feedback based on the second exemplary scheme, the CQI report may be based on the original CQI value for the best TPCC (the reference CQI) and the other CQI values differentially encoded relative to the reference CQI value. Accordingly, for the above example of computed CQI reports with M=2, and based on the second exemplary scheme, the CQI feedback may be based on CQI 1, CQI 2-CQI 1, and CQI 3-CQI 1.

In yet another example, when the UE provides CQI feedback based on the third exemplary scheme, the CQI report may be based on the original CQI value for the Mth best TPCC (the reference CQI) and the other CQI values differentially encoded relative to the reference CQI value. Accordingly, for the above example of computed CQI reports with M=2, and based on the third exemplary scheme, the CQI feedback may be based on CQI 1-CQI 2, CQI 2 and CQI 3-CQI 2.

In still another example, when the UE provides CQI feedback based on the fourth exemplary scheme, the CQI report may be based on the original CQI value for the single cell transmission (the reference CQI) and the other CQI values differentially encoded relative to the reference CQI value. Accordingly, for the above example of computed CQI reports with M=2, and based on the fourth exemplary scheme, the CQI feedback may be based on CQI 1-CQI 3, CQI 2-CQI 3, and CQI 3.

Fifth Exemplary Embodiment

An exemplary embodiment of the present invention includes a technique for the UE to feedback CQI values from a selected TPCC as well as a CQI value for the single cell transmission mode. In addition, an indicator of the selected TPCC may also be sent together with the CQI values to indicate which TPCCs the CQI value corresponds to. The possible TPCCs may be preconfigured by the network and associated with a corresponding indicator. Also, an order of the preconfigured TPCCs may by indicated by the network.

The configuration of the possible TPCCs may be based on the number of cells participating in the CoMP PDSCH transmission. Alternatively, the configuration may be based on which cells participated in the CoMP PDSCH.

Regarding the CQI feedback, when the UE is configured to feed back only one selected TPCC, any of a number of feedback component schemes that may be employed by the UE, examples of which are described below.

In a first exemplary scheme, the feedback components for the UE may include the original CQI values for the selected TPCC, the original CQI value for single cell transmission, and the indicator indicating the selected TPCC.

In a second exemplary scheme, the feedback components for the UE may include the original CQI value for the selected TPCC (the reference CQI), the CQI value for single cell transmission is differentially encoded relative to the reference CQI value, and the indicator indicating the selected TPCC. Here, the other CQI values may be differentially encoded into 2-bits, 3-bits, etc. relative to the reference CQI value.

In a third exemplary scheme, the feedback components for the UE may include the original CQI value for the single cell transmission (the reference CQI), the CQI value for the selected TPCC differentially encoded relative to the reference CQI value, and the indicator indicating the selected TPCC. Here, the other CQI values may be differentially encoded into 2-bits, 3-bits, etc. relative to the reference CQI value.

An example of the possible TPCCs and their corresponding indicators for the CoMP measurement set shown in FIG. 3 are shown below in Table 1. In Table 1, the anchor cell is assumed to participate in the CoMP PDSCH transmission, and thus the indicator only includes two fields.

TABLE 1

| Indicator | CoMP Transmission Points |
|---|---|
| [0 0] | Cell 1 |
| [0 1] | Cell 1 and Cell 2 |
| [1 0] | Cell 1 and Cell 3 |
| [1 1] | Cell 1, Cell 2 and Cell 3 |

Another example of the possible TPCCs and their corresponding indicators for the CoMP measurement set shown in FIG. 3 are shown below in Table 2. In Table 2, it is assumed that any cell may participate in the CoMP PDSCH transmission, and thus the indicator includes three fields.

TABLE 2

| Indicator | CoMP Transmission Points |
|---|---|
| [0 0 1] | Cell 1 |
| [0 1 0] | Cell 2 |
| [1 0 0] | Cell 3 |
| [0 1 1] | Cell 1 and Cell 2 |
| [1 1 0] | Cell 2 and Cell 3 |
| [1 0 1] | Cell 1 and Cell 3 |
| [1 1 1] | Cell 1, Cell 2, and Cell 3 |

An example of computing CQI feedback for DL CoMP joint processing based on possible TPCCs and their corresponding indicators are described below with reference FIG. 6.

Figure 6:
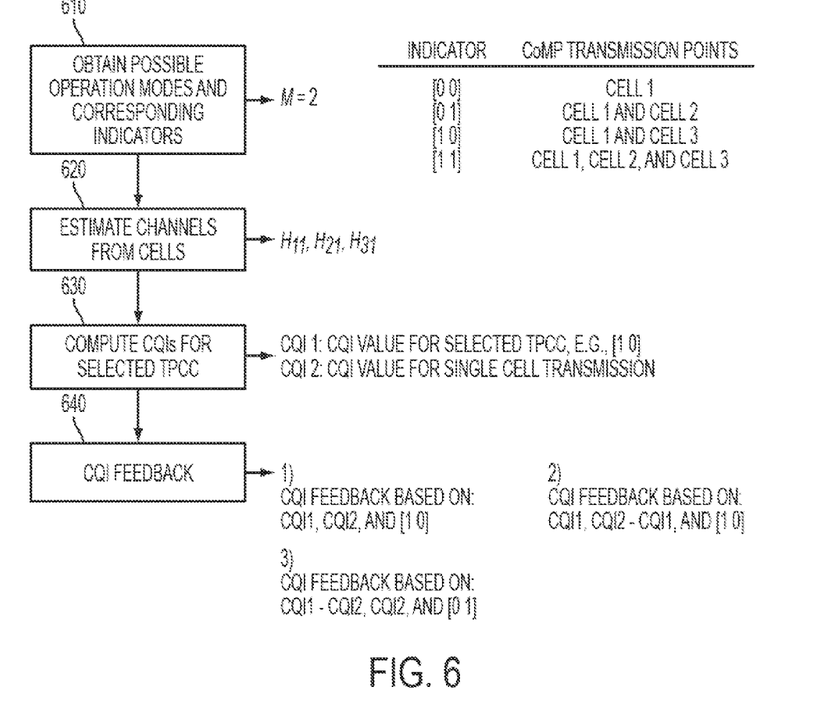
FIG. 6 illustrates a flowchart for CoMP CQI feedback based on TPCCs and their corresponding indicators according to an exemplary embodiment of the present invention.

FIG. 6 illustrates a flowchart for CoMP CQI feedback based on TPCCs and their corresponding indicators according to an exemplary embodiment of the present invention.

Referring to FIG. 6, in step 610, a UE (e.g., UE 1 of FIG. 3) receives a message including an indicator of the TPCC selected by the network from among the possible operation modes. Examples of information on the possible operation modes for the CoMP CQI measurement set of FIG. 3 include Tables 1 and 2.

In step 620, the UE receives reference signals from cells included in the CoMP measurement set (e.g., Cell 1, Cell 2, and Cell 3 of FIG. 3), and determines channel estimates (e.g., H11, H21, and H31 of FIG. 3) of the channels between the cells included in the CoMP measurement set and the UE.

In step 630, the UE may compute CQI reports for the selected operation mode based on one or more performance metrics. The performance metrics may include any performance metric related to the UE's received signal quality. For example, the performance metrics may be one or more of throughput, capacity, SINR, SNR, received signal strength, etc. Also, the fact that different TPCCs will require a different number of transmitting cells may also be taken into account. For example, the absolute performance metric such as throughput, capacity, SINR, SNR, received signal strength, etc. may be divided by the number of cells participating in the transmission so as to form the performance metric for different TPCCs. An example of computing CQIs for the selected TPCC (e.g., [1 0] from Table 1) and for single cell transmission, includes:

CQI 1: CQI value for selected TPCC (e.g., [1 0] from Table 1)

CQI 2: CQI value for single cell operation transmission

In step 640, the UE may provide CQI feedback based on any of the three exemplary schemes described above. For example, when the UE provides CQI feedback based on the first exemplary scheme, the CQI report may be based on the original CQI value for the selected TPCC, the original CQI value for single cell transmission together, and the indicator indicating the selected TPCC. Accordingly, for the above example of computed CQIs, and based the first exemplary scheme, the CQI feedback may be based on CQI 1, CQI 2, and [1 0].

In another example, when the UE provides CQI feedback based on the second exemplary scheme, the CQI report may be based on the original CQI value for the selected TPCC (the reference CQI), the CQI value for single cell transmission differentially encoded relative to the reference CQI value, and the indicator indicating the selected TPCC. Accordingly, for the above example of computed CQIs, and based on the second exemplary scheme, the CQI feedback may be based on CQI 1, CQI 2-CQI 1, and [1 0].

In yet another example, when the UE provides CQI feedback based on the third exemplary scheme, the CQI report may be based on the original CQI value for the single cell transmission (the reference CQI), the CQI value for the selected TPCC differentially encoded relative to the reference CQI value, and the indicator indicating the selected TPCC. Accordingly, for the above example of computed CQIs, and based on the third exemplary scheme, the CQI feedback may be based on CQI 1-CQI 2, CQI 2 and [0 1].

Channel Matrix Feedback

As discussed above, it has been decided that the DL transmission of LTE-A will be based on Dedicated Reference Signals (DRSs). Accordingly, a network does not need to inform the UE of which precoding vectors or matrices it is using in the DL transmission. Therefore, the DL transmission may be based on any precoding vectors or matrices, as opposed to being constrained by the precoding vector or matrix codebook, as in first release 3GPP LTE systems. As a result, advanced channel feedback schemes may be employed to further enhance the spectral efficiency of DL transmission. A method referred to as multiple description code has been proposed to improve the performance of channel feedbacks. The scheme takes advantage of the multiple feedbacks from different codebooks on the same channel to improve feedback performance. The multiple feedbacks are averaged at the network side to attain a better estimation of the DL channel. This approach may provide an improvement over first release 3GPP LTE fixed codebook feedback schemes in correlated channels. However, in the uncorrelated channel environment where the UE sees an independent channel realization at each reporting subframe, this scheme performs poorly since the feedbacks are not targeted for the same channel realization and should not be processed together. Therefore, some signaling indicating the correlation between channel samples should be utilized to enhance the feedback report.

Sixth Exemplary Embodiment

An exemplary embodiment of the present invention includes a technique to configure a UE to feedback an indicator to the network together with one of a channel direction feedback, a precoding matrix indices feedback, a channel matrix feedback, etc. The indicator indicates to the network that DL transmission can be performed based on previous channel feedbacks as well as current channel feedback. In an exemplary implementation, one bit may be used in the UL channel feedback report to suggest whether or not DL precoding can be performed based on two consecutive feedbacks. An example of the indicator bits and their corresponding meaning are shown below in Table 3.

TABLE 3

| Bit Field | Indication to the Network |
|---|---|
| 0 | Use current channel feedback report together with previous channel feedback report to perform DL transmission precoding. |
| 1 | Only use current channel feedback report to perform DL transmission precoding. |

The channel feedback may be in the form of one of channel direction index feedback, precoding matrix index feedback, channel matrix feedback, etc. An example of generating the indication bit for channel direction index feedback is described below with reference to FIG. 7.

Figure 7:
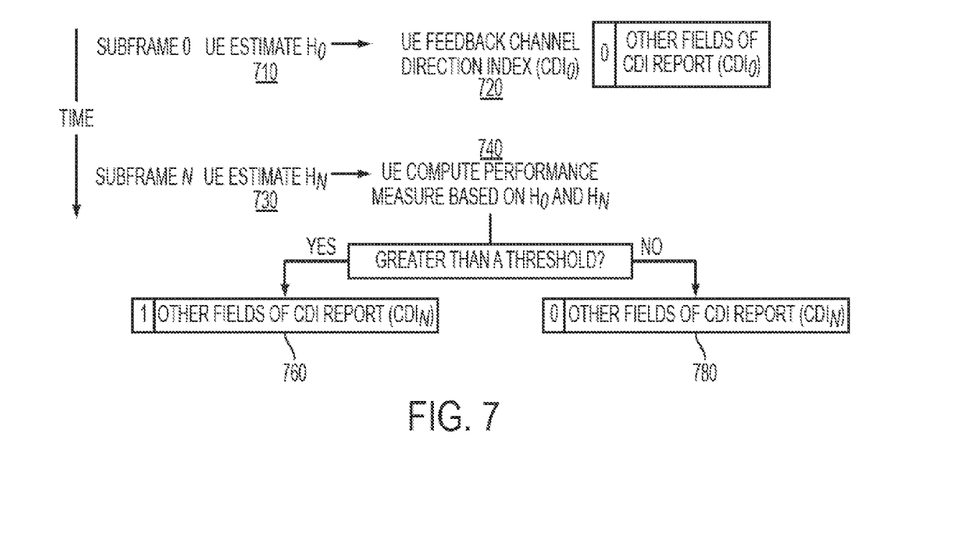
FIG. 7 illustrates a method for generating a feedback indication bit according to an exemplary embodiment of the present invention.

FIG. 7 illustrates a method for generating a feedback indication bit according to an exemplary embodiment of the present invention.

Referring to FIG. 7, in step 710, the UE estimates H0 for subframe 0. Subframe 0 is an initial subframe for which feedback is to be provided. In step 720, the UE generates and feeds back the indication bit. In this example, based on Table 3, the UE generates a '0' indication bit for Channel Direction Index 0 (CDI0) because there is no prior subframe for which feedback was provided. In step 730, the UE estimates HN for subframe N. Subframe N is the next consecutive subframe to Subframe 0 for which feedback is to be provided. In step 740, the UE computes a performance measurement based on H0 and HN. The performance measurement may be based on any of a number of schemes, examples of which are described below.

In a first exemplary scheme, the performance measurement may be based on a cross-correlation between H0 and HN.

In a second exemplary scheme, the performance measurement may be based on the SNR improvement of using the precoder based on a predefined function of CDI0 and CDIN over using the precoder based only on CDIN.

In a third exemplary scheme, the performance measurement may be based on the throughput improvement of using the precoder based on a predefined function of CDI0 and CDIN over using the precoder based only on CDIN.

In a fourth exemplary scheme, the performance measurement may be based on the chordal distance improvement (relative to HN) of the precoder based on a predefined function of CDI0 and CDIN over the precoder based only on CDIN. An example of the chordal distance improvement is:

$$\Delta d = d_{chordal}(g(CDI_N), H_N) - d_{chordal}(f(CDI_0, CDI_N), H_N) \quad (2)$$

where f(CDI0, CDIN) is the predefined function.

After step 740, the UE may determine if the computed performance measurement is greater than a threshold in step 750. If the computed performance measurement is greater than the threshold, the UE generates a '0' indication bit for Channel Direction Index N (CDIN) in step 760. Here, the UE is indicating to the network that the channel estimate HN for subframe N is not sufficiently correlated to the channel estimate H0 for subframe 0 and thus the network should utilize only the channel estimate HN for subframe N to perform DL transmission precoding.

In contrast, if the computed performance measurement is not greater than the threshold, the UE generates a '1' indication bit for Channel Direction Index N (CDIN) in step 770. The threshold may be provided to the UE by the network or determined by the UE. Here, the UE is indicating to the network that the channel estimate HN for subframe N is sufficiently correlated to the channel estimate H0 for subframe 0 and thus the network can utilize the channel estimate H0 for subframe 0, in addition to the channel estimate for HN for subframe N, to perform DL transmission precoding.

An exemplary embodiment of the present invention includes a technique for a BS (or eNB) to interpret an indicator upon reception of the indicator from a UE. An example of interpreting a feedback indicator bit at a BS (or eNB) for channel direction index is described below with reference to FIG. 8.

Figure 8:
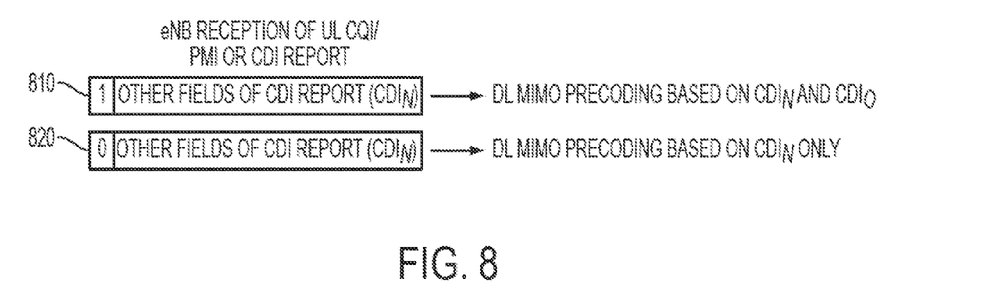
FIG. 8 illustrates a feedback indication bit according to an exemplary embodiment of the present invention.

FIG. 8 illustrates a feedback indication bit according to an exemplary embodiment of the present invention.

Referring to FIG. 8, if a feedback indication bit of '1' 810 is received in a CDI report, the BS (or eNB) interprets the '1' as indicating DL precoding based on CDI0 and CDIN. In other words, the network determines the precoding of DL transmission based on a previous channel feedback report together with a current channel feedback report. In contrast, if a feedback indication bit of '0' 820 is received in a CDI report, the BS (or eNB) interprets the '0' as indicating DL precoding based on only CDIN.

The determination of precoding vectors or matrices from the two channel feedback reports should be predefined. The DL transmission precoding may be formed based on any of a number of schemes, examples of which are described below.

In a first exemplary scheme, the precoding vector or matrix may be an average of the two channel feedback reports. In a second exemplary scheme, the precoding vector or matrix should be formed from the same predefined function of the two channel feedback reports as used by the UE for computing the performance measure based on H0 and HN. In a third exemplary scheme, the precoding vector or matrix may be the weighted sum of the two channel feedback reports.

An exemplary embodiment of the present invention, several bits may be used to indicate how to perform DL transmission precoding. For example, when a 2 bit indicator [b0 b1] is used in the channel feedback report, a mapping, such the mapping shown in Table 4, may be used.

TABLE 4

| $b_0$ | $b_1$ | Indication to the Network |
| --- | --- | --- |
| 0 | 0 | Perform DL precoding only based on current channel feedback report |
| 0 | 1 | Perform DL precoding based on previous channel feedback report together with current channel feedback report |
| 1 | 1 | Perform channel precoding based on previous two channel feedback reports |
| 1 | 0 | Perform channel precoding based on previous three channel feedback reports |

The mapping shown in Table 4 is merely one example of a mapping based on a 2 bit indicator. Any of the indications to the network for a particular combination of bits the 2 bit indicator may differ from that shown in Table 4.

Figure 9:
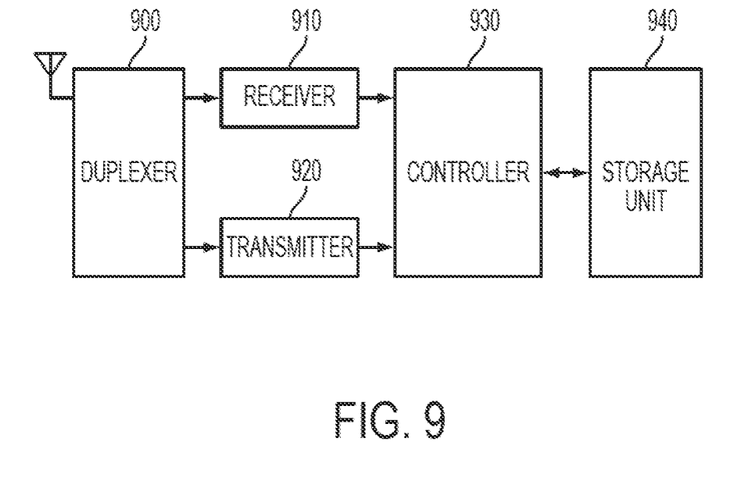
FIG. 9 is a block diagram illustrating a UE in a wireless communication system according to an exemplary embodiment of the present invention.

FIG. 9 is a block diagram illustrating a UE in a wireless communication system according to an exemplary embodiment of the present invention.

Referring to FIG. 9, the UE includes a duplexer 900, a receiver 910, a transmitter 920, a controller 930, and a storage unit 940. The UE may include any number of additional structural elements. However, a description of additional structural elements of the UE is omitted for conciseness.

The duplexer 900 transmits a transmission signal provided from the transmitter 920 via an antenna, and provides a reception signal from the antenna to the receiver 910 according to a duplexing scheme.

The receiver 910 converts the reception signal provided from the duplexer 900 into a baseband signal, and provides the baseband signal to the controller 930. For example, when the wireless communication system uses an Orthogonal Frequency Division Multiplexing (OFDM) scheme, the receiver 910 includes a Radio Frequency (RF) processor, an Analog/Digital Converter (ADC), an OFDM demodulator, and a decoder. Accordingly, the RF processor converts an RF signal provided from the duplexer 900 into a baseband analog signal. The ADC converts the analog signal provided from the RF processor into digital sample data. The OFDM demodulator transforms sample data in a time domain provided from the ADC into data in a frequency domain by performing a Fast Fourier Transform (FFT). The decoder demodulates and decodes a signal provided from the OFDM demodulator according to a Modulation and Coding Scheme (MCS) level.

The controller 930 controls overall operations of the UE. The operations of UE include any of the operations explicitly or implicitly described above as being performed by a UE. For example, the controller 930 may control the receiver and transmitter, and may control to obtain one or more TPCCs, each TPCC including a unique combination of one or more cells in a CoMP measurement set, control to estimate a channel for one or more cells in the CoMP measurement set, control to compute a CQI for each of at least one of the one or more TPCCs, each CQI being computed using one or more estimated channels that correspond to the combination of one or more cells included in a corresponding TPCC, control to generate CQI feedback information based on the one or more CQIs, and control the transmitter to transmit the CQI feedback information. Alternatively, the controller 930 may control to determine, based on one or more performance metrics of a previous channel estimate and a current channel estimate, if the eNB can perform downlink transmission precoding based on one of current feedback information together with previous feedback information and only the current CQI feedback information, control to generate feedback information, the feedback information including an indicator indicating that the eNB can perform downlink transmission precoding based on one of current feedback information together with previous feedback information and only the current CQI feedback information, and control the transmitter to transmit the feedback information.

The transmitter 920 converts a transmission signal into an RF signal, and provides the RF signal to the duplexer 900 under control of the controller 930. For example, when the wireless communication system uses an OFDM scheme, the transmitter 920 includes an encoder, an OFDM modulator, a Digital/Analog Converter (DAC) and an RF processor. The encoder encodes and modulates a transmission signal according to an MCS level under control of the controller 930. The OFDM modulator converts data in the frequency domain provided from the encoder into sample data (i.e., an OFDM symbol) in a time domain by performing an Inverse FFT (IFFT). The DAC converts sample data provided from the OFDM modulator into an analog signal. The RF processor converts a baseband analog signal provided from the DAC into an RF signal.

The storage unit 940 stores programs required for overall operations of the UE and various data, including any of the information and/or the algorithms discussed herein as being received, transmitted, retained or used by a UE.

Figure 10:
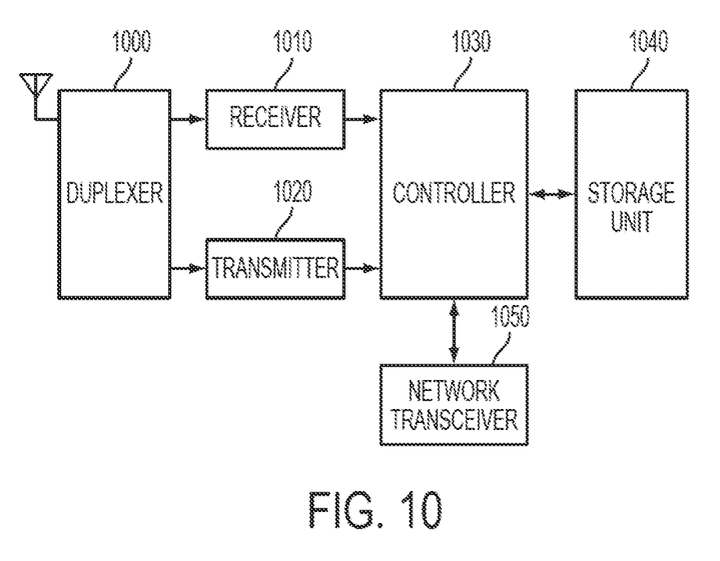
FIG. 10 is a block diagram illustrating a BS in a wireless communication system according to an exemplary embodiment of the present invention.

FIG. 10 is a block diagram illustrating a BS in a wireless communication system according to an exemplary embodiment of the present invention.

Referring to FIG. 10, the BS includes a duplexer 1000, a receiver 1010, a transmitter 1020, a controller 1030, a storage unit 1040, and a network transceiver 1050. The BS may include any number of additional structural elements. However, a description of additional structural elements of BS is omitted for conciseness. The BS may be any type of BS including an eNB, etc.

The duplexer 1000 transmits a transmission signal provided from the transmitter 1020 via an antenna, and provides a reception signal from the antenna to the receiver 1010 according to a duplexing scheme.

The receiver 1010 converts a reception signal provided from the duplexer 1000 into a baseband signal and provides the baseband signal to the controller 1030. For example, when the wireless communication system uses an OFDM scheme, the receiver 1010 includes an RF processor, an ADC, an OFDM demodulator and a decoder. The RF processor converts an RF signal provided from the duplexer 1000 into a baseband analog signal. The ADC converts the analog signal provided from the RF processor into digital sample data. The OFDM demodulator converts sample data in the time domain provided from the ADC into data in the frequency domain by performing FFT. The decoder demodulates and decodes a signal provided from the OFDM demodulator according to an MCS level.

The controller 1030 controls overall operations of the BS. The operations of the BS include any of the operations explicitly or implicitly described above as being performed by a BS, such as an eNB. For example, the controller 1030 may control the receiver, transmitter and network transceiver. Further, the controller 1030 may control to receive CQI feedback. In addition, the controller 1030 may control to configure TPCCs, provide a UE with a value of M, and/or provide a UE with an indicator corresponding to a TPCC. Alternatively, the controller 1030 may control to receive an indicator received in a feedback used to indicate whether or not DL precoding can be performed based on two consecutive feedbacks.

The transmitter 1020 converts a transmission signal into an RF signal and provides the RF signal to the duplexer 1000 under control of the controller 1030. For example, when the wireless communication system uses an OFDM scheme, the transmitter 1020 includes an encoder, an OFDM modulator, a Digital/Analog Converter (DAC) and an RF processor. The encoder encodes and modulates a transmission signal according to an MCS level under control of the controller 1030. The OFDM modulator converts data in the frequency domain provided from the encoder to sample data (i.e., an OFDM symbol) in the time domain by performing IFFT. The DAC converts sample data provided from the OFDM modulator into an analog signal. The RF processor converts a baseband analog signal provided from the DAC into an RF signal.

The storage unit 1040 stores programs required for overall operations of the BS and various data including any of the information and/or algorithms discussed herein as being received, transmitted, retained or used by a BS, such as an eNB.

The network transceiver 1050 facilities communication with other network entities within a wireless communication system, such as a wireless communication system operating according to the IEEE 802.16m, 3GPP LTE or 3GPP LTE-A standards.

Certain aspects of the present invention may also be embodied as computer readable code on a computer readable recording medium. A computer readable recording medium is any data storage device that can store data, which may be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention may be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a User Equipment (UE) to transmit Channel Quality Index (CQI) feedback information to an evolved Node B (eNB) in a wireless communication system, the method comprising:
    obtaining a plurality of Transmission Points Configurations for Coordinated MultiPoint (CoMP) (TPCCs), each TPCC including a unique combination of one or more cells in a CoMP measurement set, wherein the plurality of TPCCs comprises each possible combination including an anchor cell of the cells in the CoMP measurement set;
    estimating a channel for one or more cells in the CoMP measurement set;
    computing a CQI for each of at least one of the TPCCs, each CQI being computed using one or more estimated channels that correspond to the combination of one or more cells included in a corresponding TPCC;
    generating CQI feedback information based on the one or more CQIs; and
    transmitting the CQI feedback information.

2. The method of claim 1, wherein the obtaining of the TPCCs comprises receiving a message from the eNB identifying the TPCCs, wherein the TPCCs are semi-statistically configured by the eNB.

3. The method of claim 1, wherein the obtaining of the TPCCs comprises determining the TPCCs.

4. The method of claim 1, further comprising:
    receiving a message from the eNB including a number M, wherein the obtaining of the TPCCs comprises determining the M best TPCCs, wherein the M best TPCCs are determined based on one or more performance metrics related to received signal quality.

5. The method of claim 1, wherein each of the TPCCs corresponds to an indicator, and wherein the obtaining of the TPCCs comprises receiving an indicator corresponding to a TPCC selected by the eNB.

6. The method of claim 1, wherein the CQI feedback information comprises a reference CQI and one or more differential CQIs, wherein the one or more differential CQIs are differentially encoded relative to the reference CQI.

7. A User Equipment (UE) apparatus for transmitting Channel Quality Index (CQI) feedback information to an evolved Node B (eNB) in a wireless communication system, the apparatus comprising:
    a receiver for receiving signals from one or more cells in a CoMP measurement set;
    a transmitter for transmitting signals to at least one cell; and
    a controller for controlling the receiver and transmitter, and for controlling to obtain a plurality of Transmission Points Configurations for Coordinated MultiPoint (CoMP) (TPCCs), each TPCC including a unique combination of one or more cells in a CoMP measurement set, for controlling to estimate a channel for one or more cells in the CoMP measurement set, the plurality of TPCCs comprising each possible combination including an anchor cell of the cells in the CoMP measurement set, for controlling to compute a CQI for each of at least one of the TPCCs, each CQI being computed using one or more estimated channels that correspond to the combination of one or more cells included in a corresponding TPCC, for controlling to generate CQI feedback information based on the one or more CQIs, and for controlling the transmitter to transmit the CQI feedback information.

8. The apparatus of claim 7, wherein the controller when controlling to obtain the TPCCs, controls to receive a message from the eNB identifying the TPCCs, wherein the TPCCs are semi-statistically configured by the eNB.

9. The apparatus of claim 7, wherein the controller when controlling to obtain the TPCCs, controls to determine the TPCCs.

10. The apparatus of claim 7, wherein each of the TPCCs corresponds to an indicator, and wherein the controller when controlling to obtain the TPCCs, controls to receive an indicator corresponding to a TPCC selected by the eNB.

11. The apparatus of claim 7, wherein the controller controls to receive a message from the eNB including a number M, and wherein the controller when controlling to obtain the TPCCs, controls to determine the M best TPCCs, wherein the M best TPCCs are determined based on one or more performance metrics related to received signal quality.

12. The apparatus of claim 7, wherein the CQI feedback information comprises a reference CQI and one or more differential CQIs, wherein the one or more differential CQIs are differentially encoded relative to the reference CQI.

* * * * *